Patented Nov. 8, 1949

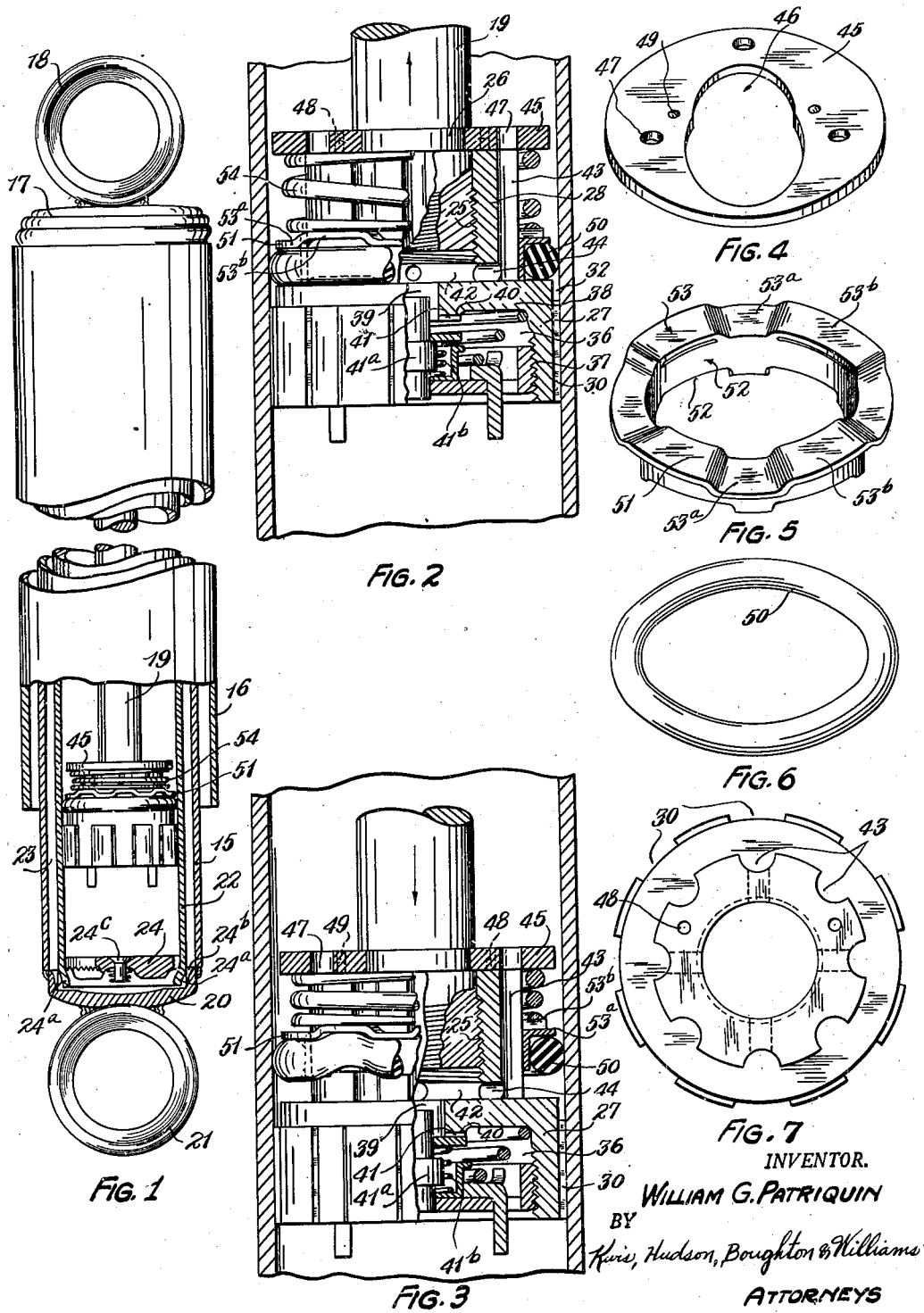

2,487,471

UNITED STATES PATENT OFFICE 2,487,471

SHOCK ABSORBER

William G. Patriquin, Cleveland, Ohio, assignor to The Gabriel Company, Cleveland, Ohio, a corporation of Ohio Application May 28, 1947, Serial No. 750,901

3 Claims. (Cl. 188—88)

This invention relates to a shock absorber and, more particularly, to a fluid shock absorber.

Although the invention is applicable to various types of shock absorbers, it is illustrated and explained herein by way of example as embodied in a direct double-acting hydraulic shock absorber. In certain of its aspects the invention is an improvement on the inventions disclosed in the patents to Eugene L. Beecher, Nos. 2,369,008 and 2,396,227, dated February 6, 1945, and March 12, 1946, respectively, in both of which patents the piston of the shock absorber is provided with a shiftable ring that performs the dual function of a piston packing ring and a valve, the former patent showing the ring mounted in a ring groove of undulating axial width wherein the ring is alternately restricted and freely movable in the groove and the latter patent showing the ring mounted on a carrier which has sliding movement on and axially of the piston.

An object of the present invention is to provide, in connection with the inventions described in the above referred to patents, an improved relationship between the piston and the packing ring therefor, such that while the ring is still squeezed or distorted radially to form a packing and act as a valve to close passages through the piston upon movement of the piston in one direction it also acts as a two-stage valve upon movement of the piston in the other direction, portions of the ring moving freely immediately upon initiation of such movement to a partial valve open or valve unseated position to provide a predetermined bleed, and the whole ring moving to an increased valve open position upon further movement of the piston and an undue increase in the hydraulic pressures as a result of rapid movement of the piston in the said direction.

Another object of the invention is the provision of a new and improved combined packing and valve mechanism for the reciprocating elements of a hydraulic shock absorber, one of the elements having a groove for the packing ring of undulating width whereby portions of the packing ring may flex axially to partially open passages through the element upon movement thereof in one direction, and wherein said groove is axially increasable in width under the influence of hydraulic pressures to permit axial movement of the entire packing ring to more completely open the passages through the element.

Another object of the invention is the provision of a new and improved arrangement for a piston, packing ring, and packing ring groove on the piston, the groove having passages adjacent the base thereof for communicating the upper and lower sides of the piston, and a normal undulating axial width to normally alternately axially squeeze and permit axial movement of corresponding alternate portions of the packing ring, the normal width of the groove being expandible to permit further axial movement of the entire packing ring whereby the packing ring may act as a two-stage valve upon movement of the piston in one direction, initially partly opening the passages through the pistón to provide a bleed and later more completely opening same.

Another object of the invention is the provision of a new and improved shiftable ring for the piston of a shock absorber which performs the dual function of a piston packing and a valve for controlling the flow of hydraulic fluid past the piston, the ring being both actuatable by movement of the piston in one direction to partly open passages through the piston for the purpose of bleeding and by increased hydraulic pressure to more completely open the passages.

Another object is to provide, in the piston of a shock absorber, a packing ring and carrier assembly forming a combined packing and/or valve closing means for passages through the piston, the assembly being normally biased by spring-like members to the valve closed position and movable upon the application of sufficient predetermined hydraulic pressure to a vlave open position, the carrier being so formed that upon initial movement of the piston on the compression or impact stroke at least portions of the packing ring may move or shift slightly relative to the piston and open partially the passages for an initial bleeding flow of hydraulic fluid therethrough.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 1 is a longitudinal elevational view of a direct double-acting tubular hydraulic shock absorber embodying the present invention with certain of the parts, including the housing and cylinder, broken away in part to show the piston and piston rod in elevation;

Figs. 2 and 3 are fragmentary sectional views on a larger scale than Fig. 1 through the work cylinder of the shock absorber shown in Fig. 1, Fig. 2 showing the relationship of the parts during the recoil stroke of the shock absorber (the up stroke of the piston), while Fig. 3 shows the relationship of the parts during the impact or compression stroke of the shock absorber (the down stroke of the piston);

Fig. 4 is a perspective elevational view of an abutment plate or washer forming part of the piston;

Fig. 5 is a perspective elevational view of a packing ring carrier for the piston packing;

Fig 6 is a perspective elevational view of the packing ring; and

Fig. 7 is a top elevational view of a member forming the body of the piston.

A shock absorber embodying the present invention is illustrated in the drawing and is, by way of example, a direct double-acting tubular telescoping hydraulic shock absorber of the type shown and described in the aforementioned patents. Only those parts of the shock absorber which are necessary to a complete understanding of the present invention are herein shown and described in detail. Reference to the aforementioned patents is made for a complete showing and description of those parts of the shock absorber not fully shown and described.

Referring to the drawings, the shock absorber shown comprises a substantially cylindrical casing 15 which has relative telescoping movement within a cylindrical guard housing 16 that is spaced radially outwardly from the casing 15. The upper end of the housing 16 is closed by an inverted cup-shaped closure or cap member 17 provided on its outer side with an eye 18 while a piston rod 19 is operatively connected to the cap member 17 and eye 18. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle, similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected with the eyes 18 and 21 by suitable means, well known in the art, wherefore relative movement between the frame and axle of the vehicle will cause relative telescoping movement between the casing 15 and the housing 16 and relative movement of the piston rod 19 and the piston secured thereto in the pressure or working cylinder, as will be well understood.

The pressure or working cylinder 22 of the shock absorber is disposed within the casing 15 in spaced concentric relationship therewith so that the space defined by the casing 15, cylinder 22, closure member 20, and a closure member for the upper end of the casing and cylinder (not shown) constitutes a reservoir 23 for the oil or liquid or fluid in the shock absorber.

The lower end of the cylinder 22 extends into the cup-shaped closure member 20 and is secured thereto by suitable means understood in the art. The cylinder 22 slightly upwardly of the lower end has secured therein a closure plate 24. The cylinder 22 below the closure plate 24 is provided with an inwardly extending bead 24a which serves to retain the closure plate in position, while the cup-shaped closure member 20 is provided with a plurality of circumferentially spaced internal grooves or channels 24b which place the reservoir 23 in communication with the space between the closure plate 24 and the bottom of the cup-shaped closure member 20. The closure plate 24 may also be provided with either a fixed or a valve controlled orifice (not shown) communicating the space between the closure plate 24 and the cup-shaped closure member 20 with the interior of the cylinder 22 and permitting hydraulic fluid to pass therethrough with a restricted or limited flow upon reciprocation of the piston in the cylinder 22. The closure plate 24 is also provided with a replenishing valve 24c, the purpose of which is well understood in the art.

The piston rod 19 at its inner end is externally threaded as indicated at 25, see Figs. 2 and 3, while just above the threads 25 the piston rod is provided with an annular recess or groove 26. The piston comprises a body which may be formed in various ways, but preferably it is a die casting. The piston body includes a lower and larger portion 27 and an upper and reduced portion 28. The periphery of the lower portion 27 of the piston body is provided with a plurality of circularly spaced axially extending grooves or passages 30, and said grooves or passages are deeper at their lower ends than they are at their upper ends for the purpose of decreasing the resistance of the bypass flow of fluid through the grooves during the impact or compression stroke of the piston. The portion 27 above the grooves 30 is of less diameter than the internal diameter of the cylinder 22, wherefore an annular space 32 is provided between the cylinder and the periphery of the upper end of the piston portion 27.

In the present illustration eight of the grooves 30 are shown, but it should be understood that the number of these grooves or passages may be varied.

The lower portion 27 of the piston body is provided with a counterbore 36, the wall of which is threaded as indicated at 37. The inner end of the counterbore 36, that is, the upper end of the portion 27 of the piston body, is separated from the upper reduced or smaller piston portion 28 by a wall 38 in the center of which is a bore 39 communicating with the counterbore 36 and with a larger central bore 42 in the upper portion 28 of the piston body. The wall 38 surrounding the bore 39 is provided with an annular impact valve seat boss 40 projecting into the counterbore 36 and provided with three radially extending grooves or notches 41 angularly spaced circularly of the seat boss 40. The bore 39 is opened and closed to communication with the counterbore 36 and thus the lower side of the piston by a valve member 41a normally biased to the closed position by a spring 41b. The notches 41 provide a bleeding action past the valve member 41a upon movement of the piston in either direction.

The upper part 28 of the piston body is provided with the previously referred to central bore 42 which is threaded so that the threaded end 25 of the piston rod 19 can be screwed into the bore 42 in uniting the piston body to the piston rod. The upper portion 28 of the piston body is also provided radially outwardly of the bore 42 with a plurality of circularly spaced axially extending peripheral recesses or grooves 43 which extend from the piston portion 27 to the end of the piston portion 28. The recesses 43 are substantially semicircular in cross section and are angularly spaced circumferentially of the piston portion 28, there being eight of such recesses illustrated herein. The recesses 43 can be die cast or otherwise formed in the piston body. The piston portion 28 is provided with four radially extending ports 44 that place the lower end of the bore 42 into communication with every alternate one of the eight axially extending recesses 43.

A spring abutment plate or washer 45 is provided with an opening 46 similar to a bayonet slot, wherefore the piston rod 19 can be passed through the enlarged part of said opening 46 and then the washer 45 can be moved transversely relative to the piston rod to bring said rod into the smaller part of the slot 46 with the edge of said smaller part engaging in the annular groove 26 of the piston rod and with the washer 45 engaging the end of the piston part 28 with said washer forming an assembly abutment for the piston body.

The large part of the bayonet slot 46 in the washer 45 overlies one of the recesses 43 communicating with one of the ports 44, and the washer is provided with a plurality of openings 47 which overlie the remaining recesses 43 communicating with the ports 44 in the upper portion 28 of the piston body. The upper portion 28 of the piston body is provided with one or more axially extending lugs 48 which, when the parts are assembled, engage in openings 49 in the washer 45, see Figs. 2, 4, and 7, and act to hold said washer against rotation relative to the piston body. The washer 45 is of less diameter than the internal diameter of the working cylinder 22, wherefore an annular space is provided between the circumference of said washer and the wall of the cylinder.

In shock absorbers of the type to which this invention pertains, the cylinder 22 in which the piston and piston rod reciprocate is preferably filled with a hydraulic shock absorber fluid and the only flow into and out of the cylinder 22 which may occur is through suitable orifices or valves in the closure plate 24, that is to say, the chamber above the piston is completely closed, the only hydraulic fluid being admitted thereto or allowed to flow therefrom being through or around the piston. With such an arrangement, if no packing were provided on the piston member, that is to say, if the hydraulic fluid could flow freely past the piston, oil would still be displaced through the orifice in the closure plate 24 as the piston rod was advanced into the cylinder 22 due to the increasing volume of the rod in the cylinder. Hydraulic pressure would thus be developed proportional to the rate of advance of the piston rod and the flow of fluid through the closure plate 24. It will be seen that in order to obtain any appreciable force opposing the advancement of the piston rod into the cylinder, a rod of rather large diameter would be required, particularly if a reasonably short length of stroke is desired. With such an arrangement the shock absorber is extremely soft to mild shocks while generally being too soft for the more severe shocks.

On the other hand, if the piston is provided with a complete packing, that is, no hydraulic fluid is allowed to flow past the piston as it is advanced into the cylinder, the oil forced or pushed by the piston must flow through the closure plate 24, the pressure developed being proportional to the rate of advance of the piston and the rate of the flow of fluid through the closure plate 24. At the same time, because the chamber above the piston is completely closed, a vacuum or negative pressure and void space will exist on the back or upper side of the piston as it is advanced since the chamber is increasing in volume, the effect of which is to increase the differential pressure between the upper and lower surfaces to give a resistance or force opposing the downward movement of the piston greater than would exist if the upper chamber were vented to atmosphere. So long as the void or substantial vacuum exists, the piston rod, or rather the volume thereof, will have no effect on the operation of the shock absorber. Accordingly, the diameter of the rod may be as desired and of considerably less diameter than required in the first mentioned situation where no packing is provided. With a shock absorber in which no hydraulic fluid is allowed to flow past the piston, the ability of the shock absorber to resist the heavier shocks is generally improved while at the same time generally increasing the stiffness of the shock absorber to the lighter shocks.

As a third possible situation, if the hydraulic fluid is allowed to flow past the piston to a limited or restricted extent, the oil displaced which must flow through the closure plate 24 will be dependent on the displacement of the piston minus the amount of fluid flowing past the piston. Should the volume of fluid allowed to flow past the piston be less than the increase in the volume of the chamber above the piston, the vacuum and void above the piston will still be present and again the volume or cross-sectional area of the piston rod will again have no effect on the operation of the shock absorber.

In the first mentioned patent to Eugene L. Beecher referred to, namely the one wherein the packing is positioned in a packing ring groove of undulating axial width immediately upon the downward or impact stroke of the piston in the cylinder, the packing ring shifts in its groove to uncover passages in the base thereof communicating the upper and lower sides of the piston and permitting an immediate flow of hydraulic fluid past the piston. With such an arrangement it will be seen that this shock absorber may operate within the region of the first referred to situation wherein the cross-sectional area and thus the volume of the piston rod enters into the operation of the shock absorber and to a large extent controls the rate of the flow of fluid through the closure plate at the lower end of the cylinder and thus the resistance to movement of the piston.

In the other referred to Beecher patent wherein the packing is shown mounted on an inverted L-shaped carrier ring slidably mounted on the piston and spring biased to a valve closed position against flow of fluid past the piston, as the piston commences its downward movement on the impact stroke, the operation thereof is definitely in the region of the second referred to situation wherein no fluid can flow past the piston, and thus the cross-sectional area or the volume of the piston rod has no effect. With this construction, however, when the differential of the pressures on the upper and lower sides of the packing member reaches a predetermined value sufficient to overcome the bias of the spring member, the packing may move upwardly, opening for restricted communication passages through the piston. Inasmuch as the bias of the spring is considerable, the amount of fluid flowing past the piston will not be sufficient to make up for the increase in volume of the chamber above the piston and the cross-sectional area or the volume of the piston rod will have no effect on the operation of the shock absorber.

The present invention contemplates a construction and arrangement whereby passages in the piston are opened immediately upon the initiation of the downward or impact stroke of the piston to permit a bleeding action thereby, and yet upon a further movement of the piston downwardly to require a high differential pressure between opposite sides of the piston so as to produce a low or negative pressure on the upper side thereof and thus obviate the effects of the cross-sectional area or the volume of the piston rod.

In the embodiment of the invention shown, a flexible packing and valve ring 50 of normally circular cross section and formed of any suitable material, such as synthetic rubber for example, is mounted on a carrier 51 which is slidable on the upper portion 28 of the piston body. The carrier 51 is in the form of a ring of angular cross section having an arm 52 that extends longitudinally or axially of the piston and which contacts the piston portion 28 and slides therealong and a radially extending arm 53 which overlies the upper axial side of the ring 50 as viewed in the drawings. It will thus be seen that the ring 50 moves with the carrier 51 toward and away from the piston portion 27 upon changes in direction of piston movement, and that when the ring 50 is in the position shown in Fig. 2 it acts as a valve to close the space 32 and the passages or grooves 30 to communicate with the upper side of the piston. While in the position indicated in Fig. 3, said space and passages are open and are in communication with the passages 43, thereby permitting a flow of hydraulic fluid from the lower side of the piston of the shock absorber to the upper side thereof. A coil spring 54 is mounted on the piston portion 28 and abuts at its ends the washer 45 and the carrier 51 and exerts pressure on the carrier toward the portion 27 of the piston body, normally biasing the ring 50 to the valve closed position. The ring 50 and carrier assembly are movable as a unit upon a sufficient differential in hydraulic pressure being developed during the impact stroke of the piston on opposite sides of the ring 50 to overcome the force of the spring 54.

The radially extending arm 53 of the carrier 51 generally undulates axially in a circumferential direction to form a plurality of alternate ring engaging flats 53a and a plurality of other flats 53b axially displaced upwardly from the plane of the ring engaging flats. The ring groove thus formed between the arm 53 and the piston portion 27 when in the position shown in Fig. 2 varies from a minimum axial width slightly less than to a maximum width slightly greater than the cross-sectional diameter of the ring 50. The ring 50 is preferably flat in its normal and unstressed state, and, when supported on the carrier 51, its upper axial side abuts against the ring engaging flats 53a and is spaced from the lower surface of the axially displaced flats 53b. The lower axial side of the ring 50 when in the position shown in Fig. 2 abuts against the piston portion 27 providing a fluid seal, preventing flow of hydraulic fluid from the passages 43 to the passage 30 and thus past the piston on the upward or recoil stroke. Upon opposite movement of the piston, however, the portions of the ring 50 opposite the axially displaced portions 53b may move upwardly away from the piston portion 27 slightly opening the passages 30, 43 to restricted bleeding communication.

As previously stated, the carrier 51 and the ring 50 may move as a unit upon application of a sufficient amount of hydraulic pressure to the lower side of the ring 50 to overcome the force of the spring 54, the amount of pressure being predetermined by choosing a suitable strength spring 54. In the absence of the axially displaced portions 53b, i. e., if the portions 53b and the portions 53a of the radially extending arm 53 were to continuously abut at the upper surface of the ring 50 when in the position shown in Fig. 2, only a very small portion of the cross-sectional circumference of the ring 50 would be exposed to the hydraulic pressures on the lower side of the piston and on the passage 32. Thus a greater hydraulic pressure would be required to actuate the ring 50 and the carrier 51 against the force of the spring 54 than would otherwise be the case if the entire lower axial side of the ring 50 were continuously exposed to such pressure. Additionally, when the pressure in the passage 32 would become great enough on the limited cross-sectional circumference of the ring 50 exposed to overcome the force of the spring 54 and raise the ring 50 from its sealing engagement or seat on the piston portion 27, immediately upon raising the ring 50 therefrom the area or the cross-sectional circumference of the ring 50 against which the hydraulic pressure would then be acting would be immediately and very greatly increased such that the ring 50 and the carrier 51 would be snapped upwardly against the force of the spring 54. With the present construction, however, when the portions of the ring 50 opposite the axially displaced portions 53b move upwardly, a large proportion of the under or lower axial side of the ring 50 is exposed to the hydraulic pressures, such that for a given strength spring 54 the ring 50 and the carrier 51 will commence to move upwardly as a unit at a less or lower hydraulic pressure on the lower side of the piston than would otherwise be the case, and the snap-action referred to would be greatly reduced if not entirely eliminated.

The axially extending arm 52 of the carrier has its length determined with reference to the ring engaging flats 53a and the cross-sectional diameter of the ring 50 so that when the ring 50 is in the valve closed position as indicated in Fig. 2, the free end of the arm 52 may positively abut the piston portion 27 and the carrier cannot move further toward the portion 27. Consequently, the distorting or squeezing force of the carrier 51, and particularly of the ring engaging flats 53a, on the ring 50 in a direction axially of the piston, and when the ring 50 is in the position shown in Fig. 2, can be predetermined so as to be equal to or greater or less than the pressure or squeezing action on the ring 50 in a radial direction. For example, should the pressure or squeeze on the ring 50 in a radial direction be a predetermined amount, the arm 52 can be so proportioned as to obtain the same or a greater or less pressure or squeeze on the ring 50 in an axial direction when the ring 50 is seated against the piston portion 27. Since the spring 54 seats the carrier against the piston portion 27, different strength springs may be used without affecting the desired and predetermined pressure or squeeze on the ring 50 in the axial direction, since the space in said direction between the piston portion 27 and the radially extending arm of the carrier is always the same when the free end of the arm 52 of the carrier is contacting the piston portion 27. The arrangement just described frees the ring 50 of excessive load as it removes fluid pressure against the inner diameter of the ring 50 during the recoil stroke of the piston, since said inner diameter of the ring 50 is covered by the carrier arm 52. The free end of the arm 52 has spaced narrow elongated cutaway portions 52a axially aligned with the axially displaced portions 53b to provide, when the free end of the arm 52 abuts the piston portion 27, radial passages through the arm 52 which may communicate the space 32 with the recesses 43, for reasons which will hereinafter become apparent. The depth of the cutaway portions is preferably less than the cross-sectional radius of the ring 50, wherefore when the ring 50 is compressed radially between the arm 52 and the cylinder it will not extend into the openings formed.

With the construction shown, the above referred to pressure or squeeze on the ring 50 in an axial direction when the ring 50 is seated against the piston portion 27 is only present intermediate the piston portion 27 and the ring engaging flats 53a. Elsewhere, and particularly opposite the axially displaced portions 53b, the ring 50, while squeezed radially, is free to move in a vertical axial direction relative to the carrier 51 at least to a limited degree until the upper side of the ring 50 engages or abuts against the lower side of the axially displaced portions 53b. Such movement of the ring 50 may take place notwithstanding that the carrier 51 remains stationary on the piston. Because of the radial force of the ring 50 against the cylinder wall and the friction thereof, the portions of the ring 50 opposite the axially displaced portions 53b will move axially upwardly relative to the portion of the ring 50 opposite the ring engaging flats 53a immediately upon initiation of the impact stroke or downward movement of the piston. When the ring 50 so moves, the space 32 and the passages or grooves 30 are in communication with the passages 43 to a limited extent through the cutout portions 52a, thus allowing an immediate limited or bleeding flow of fluid from the bottom side of the piston to the upper side thereof, which flow of fluid results notwithstanding that the differential pressures on opposite sides of the piston are insufficient to overcome the force or pressure of the spring 54 and raise the carrier 51 and the ring 50 from their seat on the lower piston portion 27. The hydraulic pressures on the lower side of the piston are also exerted on the lower side of the ring 50, and particularly on the axially shifted portions of the ring 50, and when the pressures become sufficiently large to overcome the force or pressure of the spring 54, the carrier 51 will slide axially upwardly on the piston, more fully opening the space 32 and the grooves 30 to communication with the passages 43, permitting a fuller flow of fluid past the piston. Thus a sequential or two-stage opening of the passages communicating the lower side of the piston with the upper side thereof results, the initial opening coming as a result of movement of the piston on its downward stroke independently of the fluid pressures involved.

Referring to Fig. 6, it will be noted that the ring 50 during the impact or compression stroke, i. e., the down stroke, has any substantial pressure or squeeze in an axial direction removed therefrom, and at such time the ring extends below the free end of the arm 52 of the carrier. However, when the direction of the piston movement is reversed and the piston is traveling in its recoil stroke, i. e., an up direction, the spring 54 and the fluid pressure on the carrier and ring move the ring 50 toward the piston portion 27 until the ring contacts said piston portion with the desired predetermined axial pressure or squeeze, at which time the free end of the arm 52 of the carrier positively engages the piston portion 27, in other words, there is a sequential engagement of the portion 27 by the ring and carrier as the ring 50 engages the piston portion 27 during the recoil stroke before the carrier engages said portion and cushions the latter part of the movement of the carrier toward the piston portion 27, thus obviating objectionable clicking noises which would occur should the carrier engage the piston portion 27 without the cushioning action of the ring 50.

It is not believed necessary to specifically describe the cycle of operation of the shock absorber disclosed herein, since the manner in which the ring 50 functions has been referred to above and the manner in which the various other valves not specifically described but shown are referred to in the aforesaid patents and will be well understood by those skilled in the art. It should suffice to say that on the recoil stroke of the piston (Fig. 2) the ring 50 closes the passages 30, 32 in the piston body, thus serving both as a piston packing and as a valve or passage closing means. On the impact stroke of the piston, and particularly upon initiation thereof, the portions of the ring 50 opposite the axially displaced portions 53b move away from the piston portion 27 and partially open the passages 30 in the piston body. Upon continued movement of the piston and upon a fluid pressure developing on the impact stroke, the ring 50 together with the carrier 51 move upwardly against the force of the spring 54, more fully opening the passages 30 to the passages 43.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

Having thus described my invention, I claim:

1. In a fluid shock absorber, a cylinder, a piston reciprocable therein and having a portion of reduced diameter providing an annular space between it and said cylinder, passages extending from the opposite ends of said piston and communicating with said space, a flexible packing ring slidable on said portion of reduced diameter, an annular member including radially extending circumferentially spaced portions abutting an axial side of said ring, spring means acting on said member to yieldingly abut an opposite axial side of said ring with said piston wherefore to normally close said passages, the portions of said ring intermediate said circumferentially spaced portions being relatively freely shiftable relative to said member to partly open said passages upon movement of said piston relative to said cylinder in one direction, said member and said ring being shiftable together as a unit on said piston and against the load of said spring means as a result of increased hydraulic pressure in said cylinder during continued relative movement of said cylinder and piston in said one direction to further open said passage, whereby said ring functions as a two-stage valve, the first-stage valve function being obtained by the relatively freely shifting movement of said ring portions which are intermediate the circumferentially spaced portions of said annular member and the said second-stage valve function being obtained by the shifting of said ring as a unit against the load of said spring means.

2. In a fluid shock absorber, a cylinder, a piston reciprocable therein and having a portion of reduced diameter providing an annular space between it and the cylinder, an annular carrier having a radially extending arm and an axially extending arm slidable on said portion of reduced diameter, spring means acting on the radially extending arm of said carrier to abut the free end of the axially extending arm with said piston, said radially extending arm having a plurality of alternate axially displaced portions, said axially extending arm having on its free end spaced cutout portions providing an opening intermediate said free end and said piston communicating at each radial end with said passages of said piston, a flexible packing ring mounted on said carrier and contacting the axially extending arm and the undisplaced portions of said radially extending arms, and normally interrupting communication between said passages, said ring being normally compressed between said axially extending arm and said cylinder and said undisplaced portions and said piston, said ring being shiftable relatively freely axially relative to said carrier opposite said displaced portions of said radially extending arm upon movement of said piston in one direction whereby to communicate said passages without shifting movement of said carrier, said carrier and said ring being bodily shiftable as a unit against said spring means under a predetermined hydraulic pressure during movement of said piston in said one direction, whereby said ring functions as a two-stage valve, the first-stage valve function being obtained by the relatively freely shifting movement of the ring opposite the displaced portions of said radially extending arm of the carrier and the second-stage valve function being obtained by the bodily shifting of said carrier and ring as a unit against said spring means and under a predetermined pressure.

3. In a direct double-acting tubular telescoping hydraulic shock absorber, in combination: a working cylinder, a piston relatively rdeciprocable in said cylinder and dividing the same into two chambers, a reservoir, means placing one of said chambers in communication with said reservoir for effecting a predetermined flow of liquid from said chamber to said reservoir upon movement of said piston in one direction and a predetermined return flow of liquid to said chamber upon movement of the piston in the other direction, the other of said chambers being normally sealed from communication with said reservoir, said piston being provided with a passage placing said chambers in communication with each other, a flexible packing ring carried by said piston and engaging said cylinder and movable relative to said piston to open and close said passage and functioning as a two-stage valve, spring biased means normally maintaining said ring in passage closing position, said spring biased means permitting as a first-valve stage operation limited flexing of a portion of said ring to slightly open said passage upon movement of the piston toward said one chamber and as a second-valve stage operation bodily movement of said ring to more completely open said passage upon establishment of a predetermined pressure differential between said chambers, wherefore upon such movement of the piston a bleed is established by said first stage valve operation between said chambers and the piston functions to force liquid from said one chamber into said reservoir until a predetermined pressure differential between said chambers is established, whereupon said second-stage valve operation occurs and said ring moves bodily relative to said piston and completely opens said passage, said piston being provided with another passage therethrough, and a spring pressed valve closing said passage but opening on a predetermined pressure, wherefore movement of said piston toward said other chamber causes said ring to seal said first passage and upon a predetermined pressure causes said valve to open said second passage to place said chambers in free communication while liquid flows from said reservoir into said one chamber.

WILLIAM G. PATRIQUIN.

REFERENCES CITED

The following references are of record in the file of this patent:

UNITED STATES PATENTS

| Number | Name | Date |
|---|---|---|
| 2,369,008 | Beecher | Feb. 6, 1945 |
| 2,394,356 | Beecher | Feb. 5, 1946 |